United States Patent [19]

Kawahira

[11] Patent Number: 4,703,545
[45] Date of Patent: Nov. 3, 1987

[54] METHOD FOR ASSEMBLING A SEALED TYPE MOTOR-OPERATED FLOW CONTROL VALVE

[75] Inventor: Mutsuyoshi Kawahira, Numazu, Japan

[73] Assignee: Fuji Koki Manufacturing Co., Ltd., Tokyo, Japan

[21] Appl. No.: 917,414

[22] Filed: Oct. 10, 1986

Related U.S. Application Data

[62] Division of Ser. No. 439,289, May 30, 1985, Pat. No. 4,650,156.

[30] Foreign Application Priority Data

May 30, 1984 [JP] Japan .................................. 59-78619
May 30, 1984 [JP] Japan .................................. 59-78621

[51] Int. Cl.$^4$ ............................................. B21D 53/00
[52] U.S. Cl. .................................. 29/157.1 R; 29/464
[58] Field of Search .......................... 251/129.11, 274; 29/157.1 R, 464, DIG. 44

[56] References Cited

U.S. PATENT DOCUMENTS 4,547,131 10/1985 Riffe et al. ............................. 29/464

FOREIGN PATENT DOCUMENTS 100485 7/1980 Japan ............................ 251/129.11
153774 10/1983 Japan .
191377 11/1983 Japan ............................ 251/129.11
24576 2/1984 Japan .

Primary Examiner—Mark Rosenbaum
Assistant Examiner—Ronald S. Wallace

[57] ABSTRACT

A sealed type motor-operated flow control valve comprises a valve body including two passages and a valve port connecting the two passages and formed with a valve seat, a valve member provided on the body so as to be movable between a closed position and an open position, a rotor having a rotating shaft one end of which is coupled to that end portion of the valve member more distant from the valve seat, the rotor being supported by the body so as to be rotatable in the circumferential direction of the shaft, a casing including a first half member hermetically coupled to the body and a second half member adjoining the first half member in a direction along the shaft of the rotor and hermetically coupled to the first half member, the respective inner surfaces of the first and second half members defining a sealed space to contain the rotor therein, a stator disposed in the casing and fixed to the first half member, a bracket disposed in the casing and fixed to the first half member, a bearing supported by the bracket and supporting the other end portion of the shaft of the rotor so as to be rotatable in the circumferential direction of the shaft, and a valve member drive mechanism for moving the valve member between the closed and open positions as the rotor rotates in one and the other directions.

2 Claims, 3 Drawing Figures

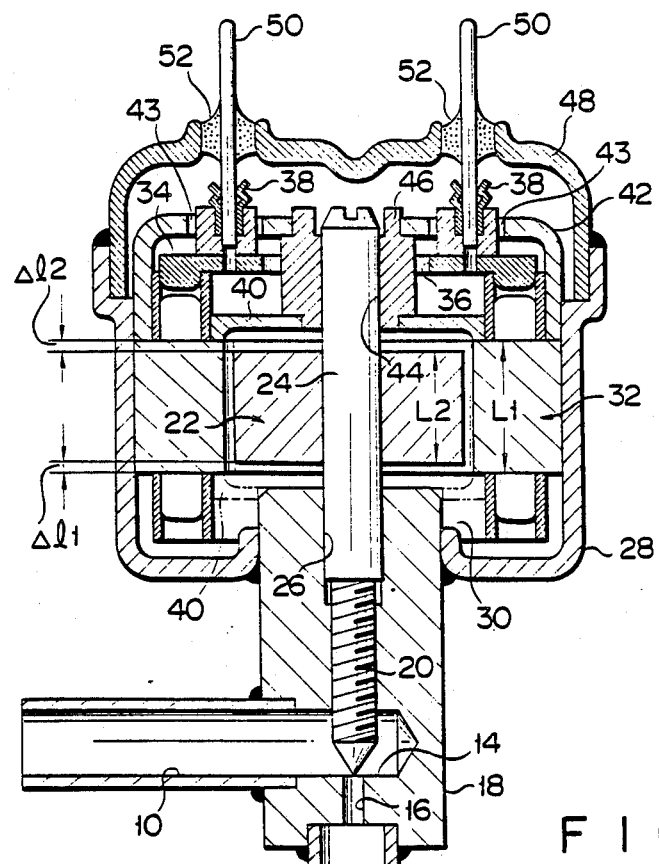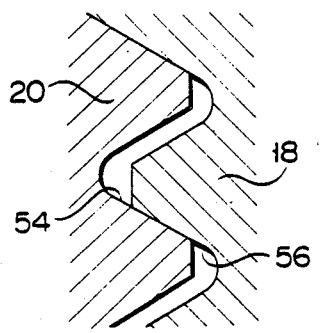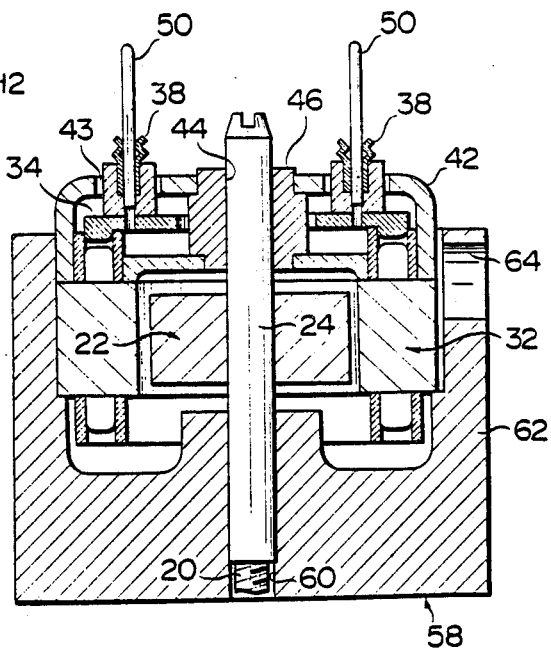

METHOD FOR ASSEMBLING A SEALED TYPE MOTOR-OPERATED FLOW CONTROL VALVE

This is a division of application Ser. No. 739,289, filed May 30, 1985, now U.S. Pat. No. 4,650,156, issued on Mar. 17, 1987.

BACKGROUND OF THE INVENTION

The present invention relates to a sealed type motor-operated flow control valve.

Motor-operated flow control valves of this type are disclosed in Japanese Utility Model Disclosure Nos. 24576/84 and 153774/83.

In a sealed type motor-operated flow control valve disclosed in Japanese Utility Model Disclosure No. 24576/84, one end portion of a rotating shaft of a rotor is screwed in a valve body which includes a first passage, a second passage, and a valve port connecting the first and second passages and formed with a valve seat. A valve member is integrally coupled to the end face of the rotating shaft at the one end portion thereof. The rotor is housed in a casing which is hermetically coupled to the valve body. A radial/thrust bearing provided on the inner surface of the casing supports the other end portion of the rotating shaft of the rotor. A stator is provided on the outer surface of the casing. In the prior art sealed type motor-operated flow control valve of this construction, the valve member is moved relatively to the valve seat between an open position and a closed position by rotating the rotor in one or the other direction. Since the wall of the casing is interposed between the rotor and the stator, however, an electric motor consisting of the rotor and the stator is low in operating efficiency, suffering a relatively great magnetic loss. With the low motor efficiency, the stator is required to be large-sized in order to provide the necessary torque for the drive of the valve member. This inevitably leads to an increase in overall size of the control valve. In this prior art control valve, moreover, the radial/thrust bearing is fixedly supported on the inner surface of the casing in a preassembly, so that heat produced during welding work for hermetically coupling the casing to the valve body may sometimes distort the casing to deflect the center of the radial/thrust bearing. If the center is deflected, the rotor will suffer greater rolling friction or be disabled from rotating. In the end, it is impossible to control with a desired accuracy the rate of flow of a fluid passing through the control valve. This constitutes a hindrance to reduction of the fraction of defective products in the production line for control valves.

In a sealed type motor-operated flow control valve disclosed in Japanese Utility Model Disclosure No. 153774/83, a valve member is screwed in a valve body which incldues a first passage, a second passage, and a valve port connecting the first and second passages and formed with a valve seat. A rotating shaft of an electric motor is coupled to that end portion (proximal end portion) of the valve member more distant from the valve seat for axial slide and for transmission of circumferential rotatory force. The motor is formed as an independent unit in which a stator and a rotor are contained in a housing, and which is independently available. The motor is housed in a casing hermetically coupled to the valve body and is supported by the inner surface of the casing. In the prior art sealed type motor-operated flow control valve of this construction, the housing of the motor as an independent unit is covered with the casing. Therefore, the external dimensions of the control valve should inevitably be increased.

In the control valve stated in the former Japanese Utility Model Disclosure, the one end portion of the rotating shaft of the rotor is screwed in the valve body. In the control valve disclosed in the latter, on the other hand, the valve member is screwed in the valve body. These arrangements will inevitably cause a backlash between the mating regions of male and female screws, so that the valve opening strictly is not constant even while the rotor is not rotating. Thus, it is impossible to control the flow rate of the fluid very accurately.

SUMMARY OF THE INVENTION

The present invention is contrived in consideration of these circumstances, and has for its first object a sealed type motor-operated flow control valve in which an electric motor is reduced in magnetic loss so that the overall size of the control valve, as well as the motor size, can be reduced, and in which bearing means for supporting the rotating shaft of a rotor will never be deflected by hermetic coupling work for a casing at assembly.

A second object of the invention is to provide a sealed type motor-operated flow control valve capable of achieving the first object, in which mutability of valve opening attributed to backlash is eliminated for highly accurate flow control.

The above first object of the invention may be achieved by a sealed type motor-operated flow control valve which comprises a valve body including a first passage, a second passage, and a valve port connecting the first and second passages and formed with a valve seat, a valve member provided on the valve body so as to be movable between a closed position where the valve member rests on the valve seat and an open position where the valve member is kept apart from the valve seat, a rotor having a rotating shaft one end of which is coupled to that end portion of the valve member more distant from the valve seat, the rotor being supported by the valve body so as to be rotatable in the circumferential direction of the rotating shaft, a casing including a first half member hermetically coupled to the valve body and a second half member adjoining the first half member in a direction along the rotating shaft of the rotor and hermetically coupled to the first half member, the respective inner surfaces of the first and second half members defining a sealed space to contain the rotor therein, a stator disposed in the casing and fixed to the first half member for rotating the rotor, a bracket disposed in the casing and fixed to the first half member, bearing means supported by the bracked and supporting the other end portion of the rotating shaft of the rotor so as to be rotatable in the circumferential direction of the rotating shaft, and valve member drive means for moving the valve member between the closed and open positions as the rotor rotates in one and the other directions.

With this arrangement, the bracket supporting the bearing means is hermetically coupled to the valve body to be fixed to the first half member having a larger thermal capacity, so that the bearing means supporting the rotating shaft of the rotor will never be deflected by heat produced during welding work for hermetically coupling the second half member to the first half member.

In the above described arrangement, moreover, there is no substance to cause magnetic loss between the stator and rotor, so that the size of the stator required for a predetermined driving force for the valve member and hence the overall size of the control valve can be made smaller than in the case where magnetic loss is caused. Since the casing containing the rotor and stator as essential components of the motor serves for the housing of commercially available motors as independent units, and moreover, is hermetically sealed, so the housing may be omitted. Thus, the control valve can be reduced in overall size, and manufacturing cost can be lowered.

Preferably, in the sealed type motor-operated flow control valve characterized by the above-mentioned novel features for the achievement of the first object, the bracket is fixed to the first half member through the medium of the stator.

With this arrangement, the bracket can be fixed to the stator in preassembly, facilitating the assembling work for the control valve as a whole.

The second object of the invention may be achieved by the sealed type motor-operated flow control valve characterized by the above-mentioned novel features for the achievement of the first object, in which the one end portion of the rotating shaft of the rotor is integrally coupled to that end portion of the valve member more distant from the valve seat and is supported by the valve body so as to be movable in the moving direction of the valve member and rotatable in the circumferential direction of the rotating shaft, the bearing means supports the other end portion of the rotating shaft of the rotor so as to be movable in the moving direction of the valve member and rotatable in the circumferential direction of the rotating shaft, the valve member is supported by the valve body so as to be movable between the closed and open positions and rotatable in the circumferential direction, the valve member drive means includes a male screw formed on the outer peripheral surface of either the rotating shaft of the rotor or the valve member and a female screw formed on the valve body so as to mate with the male screw, and a magnetic member for urging the rotor in the longitudinal direction of the rotating shaft of the rotor is disposed close to the rotor in the casing.

With this arrangement, even though there is a backlash between the male and female screws of the valve member drive means, the rotor, while not rotating, will never be caused by the backlash to reciprocate in the longitudinal direction of its rotating shaft, since the magnetic member normally urges the rotor in one direction along the rotating shaft. Thus, the valve opening is constant even while the rotor is not rotating, ensuring very accurate flow control.

BRIEF DESCRIPTION OF THE DRAWINGS

FIG. 1 is a longitudinal sectional view of a sealed type motor-operated flow control valve according to an embodiment of the present invention;

FIG. 2 is an enlarged longitudinal sectional view showing part of mating regions of a male screw on a valve member and a female screw on a valve body; and FIG. 3 is a longitudinal sectional view showing a jig used in preassembly of the flow control valve of FIG. 1 and various components preassembled on the jig.

DETAILED DESCRIPTION OF THE PREFERRED EMBODIMENT

FIG. 1 is a longitudinal sectional view of a sealed type motor-operated flow control valve according to an embodiment of the present invention.

The control valve comprises a valve body 18 which includes a first passage 10, a second passage 12, and a valve port 16 connecting the first and second passages 10 and 12 and formed with a valve seat 14.

The valve body 18 is provided with valve member drive means 21 which holds a cylindrical valve member 20 pointed at its tip end portion (lower end portion in FIG. 1) so that the valve member 20, while circumferentially rotating in either direction, can move between a closed position where its tip end portion rests on the valve seat 14 and an open position where the tip end position is kept apart from the valve seat 14. In this embodiment, the valve member drive means 21 is formed of a male screw formed on the outer peripheral surface of the valve member 20 and a female screw formed on the valve body 18 so as to mate with the male screw. The valve member 20 is coaxial with the valve seat 14.

The valve body 18 is further formed with a radial/thrust bearing hole 26 which, coaxial with the valve member 20, holds one end portion of a rotating shaft 24 of a rotor 22 so that the shaft 24 can rotate circumferentially and slide longitudinally. The one end portion of the rotating shaft 24 of the rotor 22 held in the radial/thrust bearing hole 26 is integrally coupled to that end portion of the valve member 20 more distant from the valve seat 14 by conventional fixing means such as brazing.

That portion of the valve body 18 defining the radial/thrust bearing hole 26 is inserted in a center opening 30 formed in the center of the bottom wall of a cup-shaped first half member 28, and is hermetically coupled to the first half member 28 by conventional seal-coupling means such as welding.

A stator 32 for rotating the rotor 22 is fixed to the inner peripheral surface of the first half member 28 by conventional fixing means such as force fit.

Fixed to the top end of the stator 32 is a printed board 34 having a center opening 36 which is penetrated by the other end portion of the rotating shaft 24 of the rotor 22. Well-known electrical connecting means 38 including e.g. sockets is fixed to the upper surface of the printed board 34. The electric connecting means 38 is electrically connected to one terminal of the printed board 34, the other terminal of which is electrically connected to the stator 32.

A ring-shaped magnetic member 40 is interposed between the printed board 34 and the top end face of the rotor 22. The magnetic member 40 has a center opening through which the other end portion (upper end portion in FIG. 1) of the rotating shaft 24 of the rotor 22 passes. The magnetic member 40 is fixed to the stator 32 by conventional fixing means.

A bracket 42 equal in outside diameter to the stator 32 is coaxially fixed to the stator 32, adjoining the printed board 34 on the stator 32 in a direction along the rotating shaft 24 of the rotor 22. A bearing member 46 is fixed to the center of the bracket 42 by conventional fixing means, such as welding. The bearing member 46 is formed with a radial/thrust bearing hole (bearing means) 44 for holding the other end portion (upper end portion in FIG. 1) of the rotating shaft 24 of the rotor 22 for circumferential rotation and longitudinal slide. Also, the bracket 42 is formed with apertures 43 through which the sockets of the electrical connecting means 38 on the printed board 34 pass.

The top opening of the first half member 28 is covered with an inverted-cup-shaped second half member 48 which adjoins the first half member 28 in a direction along the rotating shaft 24 of the rotor 22. The second half member 48 is hermetically coupled to the first half member 28 by conventional seal-coupling means such as welding.

Rodlike plugs 50 are hermetically fixed to the second half member 48 by means of glass seals 52. The glass seals 52 serve to electrically insulate the plugs 50 from the second half member 48. The inner end portion of each plug 50 is removably fitted in its corresponding socket of the electrical connecting means 38 to be electrically connected thereto. The plugs 50 serve as external connecting means for the stator 32.

The first half member 28 hermetically coupled to the valve body 18 and the second half member 48 hermetically coupled to the first half member 28 constitute a sealed casing. The rotor 22, stator 32, printed board 34 with electrical connecting means 38, magnetic member 40, and bracket 42 with bearing member 46 are housed in a sealed space defined by the respective inner surfaces of the first and second half members 28 and 48.

The sealed type motor-operated flow control valve according to the embodiment of the present invention described above may be used as an expansion valve for a vaporizer, and an electric motor consisting of the rotor 22, stator 32, and printed board 34 serves as a stepping motor.

When the temperature of the vaporizer (not shown) is lowered to a predetermined lower-limit level, an electrical signal is supplied from a control unit (not shown) to the printed board 34 on the stator 32 through the plugs 50. In response to this electrical signal, the rotor 22 rotates through a predetermined angle in one direction. This rotation of the rotor 22 causes the valve member 20 to rotate through the same angle and to descend relatively to the valve body 18 over a predetermined distance. As the valve member 20 moves to a predetermined position close to the valve seat 14, it causes the rate of flow of a refrigerant flowing through the control valve from the first passage 10 to the second passage 12 to be reduced by a predetermined amount so that the temperature of the refrigerant in the vaporizer increases up to a predetermined target level.

If the heights of the stator 32 and the rotor 22 in the embodiment shown in FIG. 1 are L1 and L2, respectively, it is to be desired that L1>L2. When the flow rate of the refrigerant is reduced by the predetermined amount (i.e., when the valve member 20 reaches the predetermined closed position), as aforesaid, the gap $\Delta l1$ between the respective bottom surfaces of the rotor 22 and stator 32 is preferably $\Delta l1 \geq 0$.

If this state is maintained, the temperature of the refrigerant in the vaporizer rises over the predetermined target level. When the upper-limit temperature is reached, an electrical signal opposite in polarity to the aforesaid signal is delivered from the control unit to the printed board 34 on the stator 32.

At this time, the rotor 22 rotates through a predetermined angle in the other direction opposite to the one direction, so that the valve member 20 ascends a predetermined distance while rotating inside the valve body 18. Accordingly, the valve member 20 moves to a predetermined position remote from the valve seat 14, thereby increasing the flow rate of the refrigerant flowing through the control valve from the first passage 10 to the second passage 12 by a predetermined amount so that the temperature of the refrigerant in the vaporizer is lowered to the predetermined target level. The ascent of the valve member 20 causes the rotor 22 also to ascend. When the flow rate of the refrigerant is increased by the predetermined amount (i.e., when the rotor 22 reaches the predetermined remote position), as aforesaid, the gap $\Delta l2$ between the respective top surfaces of the rotor 22 and the stator 32 is preferably $\Delta l2 \geq 0$.

In the embodiment of the present invention constructed in this manner, the rotor 22 is subjected to an upward urging force attributed to a magnetic force produced by the magnetic member 40. The upward urging force is set to be greater than a force to urge the rotor 22 and valve member 20 downwardly, resulting from the weights of the rotor 22 and valve member 20 and the pressure vector of the refrigerant flowing through the first passage 10. As shown in FIG. 2, therefore, the top surface 54 of the male screw on the valve member 20 normally abuts against the bottom surface 56 of the female screw on the valve body 18. Accordingly, even though there is a backlash between the male screw on the valve member 20 and the female screw on the valve body 18, the rotor 22 and valve member 20, while at a standstill, will never be dislocated by variation of the pressure of the refrigerant flowing through the control valve from the first passage 10 to the second passage 12 or the reversal of the flowing direction of the refrigerant. Thus, the flow rate of the refrigerant can be controlled very accurately.

If the refrigerant in the control valve flows mainly from the first passage 10 to the second passage 12, the magnetic member 40 should preferably be disposed over the rotor 22 to attract the rotor 22 upwardly. This is because the valve member 20 and rotor 22 are subjected to an upward force (FIG. 1) if the pressure of the refrigerant flowing from the first passage 10 to the second passage 12 is changed or the flowing direction is reversed. In this case, the pressure of the top surface 54 of the male screw on the valve member 20 exerted on the bottom surface 56 of the female screw on the valve body 18 increases, so that the valve member 20 will never shift its position.

Even though the refrigerant flows from the first passage 10 to the second passage 12, however, the magnetic member 40 may be opposed to the bottom surface of the rotor 22, as indicated by two-dot chain line in FIG. 1, to attract the rotor 22 downwardly. With this arrangement of the magnetic member 40, however, it is necessary that the magnetic member 40 indicated by the imaginary line be able to produce an attracting force large enough to maintain the engagement between the bottom surface of the male screw on the valve member 20 and the top surface of the female screw on the valve body 18 against the urging force to move the valve member 20 and rotor 22 upward caused by the variation of the pressure of the refrigerant flowing mainly from the first passage 10 to the second passage 12 or the reversal of the flowing direction.

If the refrigerant in the control valve flows from the second passage 12 to the first passage 10, the magnetic member 40 should preferably be opposed to the bottom surface of the rotor 22, as indicated by two-dot chain line in FIG. 1, to attract the rotor 22 downwardly. This is because the valve member 20 and rotor 22 are subjected to a downward force (FIG. 1) if the pressure of the refrigerant flowing from the second passage 12 to the first passage 10 is changed or the flowing direction is reversed. In this case, the pressure of the bottom surface of the male screw on the valve member 20 exerted on the top surface of the female screw on the valve body 18 increases, so that the valve member 20 will never shift its position.

It is to be understood that if the refrigerant flows from the second passage 12 to the first passage 10, the magnetic member 40 may be opposed to the top surface of the rotor 22, as indicated by full line in FIG. 1, to attract the rotor 22 upwardly. In this case, it is necessary that the magnetic member 40 indicated by full line be able to produce an attracting force large enough to maintain the engagement between the top surface 54 of the male screw on the valve member 20 and the bottom surface 56 of the female screw on the valve body 18, as show in FIG. 2, against the urging force to move the valve member 20 and rotor 22 downward caused by the variation of the pressure of the refrigerant flowing mainly from the second passage 12 to the first passage 10 or the reversal of the flowing direction plus the sum of the respective weights of the valve member 20 and rotor 22.

In the preassembly of the embodiment of the invention constructed in this manner, a jig 58 is used as shown in FIG. 3. The jig 58 includes a center hole 60 substantially equal in dimensions to the radial/thrust bearing hole 20 of the valve body 18, and a rising wall 62 coaxial with the center hole 60 and having an inner peripheral surface substantially equal in diameter to that of the first half member 28 hermetically coupled to the valve body 18.

In the preassembly mentioned above, the one end portion (lower end portion in FIG. 3) of the rotating shaft 24 of the rotor 22, to which the valve member 20 is previously integrally fixed, is first inserted into the center hole 60 of the jig 58. Then, the stator 32 with the magnetic member 40 previously fixed thereon is force-fitted in the space defined by the inner peripheral surface of the rising wall 62 of the jig 58, and the printed board 34 with the electrical connecting means 38 thereon is fixed to the top end of the stator 32. Subsequently, the bracket 42, to which the bearing member 46 with the radial/thrust bearing hole 44 therein is previously fixed, is further force-fitted in the space defined by the inner peripheral surface of the rising wall 62 of the jig 58 so that the bracket 42 abuts against the stator 32. The rising wall 62 of the jig 58 is formed with a plurality of apertures 64 (only one of which is shown in FIG. 3) through which the stator 32 and bracket 42 are coupled by conventional coupling means such as welding.

After the plugs 50 are fitted in the electrical connecting means 38, the bracket 42, stator 32, and rotor 22 are removed from the jig 58 and attached to their corresponding portions (FIG. 1) of the inner peripheral surface of the first half member 28 and the radial/thrust bearing hole 26 of the valve body 18 previously hermetically fitted with the first half member 28. Finally, the second half member 48 is set so as to cover the top opening of the first half member 28, and then hermetically coupled to the first half member 28. At the same time, the plugs 50 are electrically insulated from the second half member 48 by means of the glass seals 52.

The above described assembling method for the embodiment of the present invention is given only by way of example. It is to be understood that the assembling method may be changed or modified for higher efficiency according to varied situations.

What is claimed is:

1. A method of assembling a sealed type motor-operated flow control valve using a jig wherein said valve comprises:

a valve body including a first passage, a second passage, and a valve port connecting the first and second passages and formed with a valve seat;

a valve member provided on the valve body so as to be movable between a closed position where the valve member rests on the valve seat and an open position where the valve member is kept apart from the valve seat;

a rotor having a rotatable shaft one end of which is coupled to that end portion of the valve member more distant from the valve seat, said rotor being supported by a portion of the valve body so as to be rotatable in the circumferential direction of the rotatable shaft;

a casing including a first half member hermetically coupled to the valve body and a second half member adjoining the first half member in a direction along the rotatable shaft of the rotor and hermetically coupled to the first half member, the respective inner surfaces of the first and second half members defining a space to contain the rotor therein;

a stator disposed in the casing and fixed to the first half member for rotating the rotor;

a bracket disposed in the casing and fixed to the first half member;

bearing means supported by the bracket and supporting the other end portion of the rotatable shaft of the rotor so as to be rotatable in the circumferential direction of the rotatable shaft; and valve member drive means for moving the valve member between the closed and open positions as the rotor rotates in one and the other directions;

and said jig comprises an upright wall having an inner periphery; said method comprising the steps of:

supporting said one end of the rotatable shaft of the rotor on said jig in a manner as the valve body does with the inner periphery of said upright wall facing an outer periphery of the rotor;

fitting said upright wall with an outer periphery of the stator, whereby the rotor and stator are assembled into one unit on the jig, initially;

supporting the bearing means concentrically on the bracket, and then mounting the bearing means onto the other end of the rotatable shaft of the rotor and securing the bracket to the stator;

fixing the first half member to the valve body in such a manner that the inner surface of the first half member is coaxial with the portion of the valve body supporting said rotor;

removing the rotor-stator unit from the jig and fitting said one end of the rotatable shaft into the portion of the valve body supporting said rotor; and hermetically connecting the second half member to the first half member.

2. A method according to claim 1, wherein said valve further comprises a printed-wiring board fixed to said stator, and there is provided a socket and plug used as a means for electrical connection, one of said socket and plug being mounted on the printed-wiring board and the other of said socket and plug being mounted on said second half member, and said method further comprising connecting said socket and plug when hermetically connecting the second half member to the first half member with part of the other of said socket and plug being exposed externally of the outer periphery of the second half member.

* * * * *

UNITED STATES PATENT AND TRADEMARK OFFICE
CERTIFICATE OF CORRECTION

PATENT NO. : 4,703,545

DATED : Nov. 3, 1987

INVENTOR(S) : Mutsuyoshi Kawahira

It is certified that error appears in the above-identified patent and that said Letters Patent are hereby corrected as shown below:

On the title page, Item [30] should appear as shown below:

-- [30] May 30, 1984 [JP] Japan......59-78619[U]
      May 30, 1984 [JP] Japan......59-78621[U] --.

Signed and Sealed this

Thirtieth Day of August, 1988

Attest:

DONALD J. QUIGG

*Attesting Officer*      *Commissioner of Patents and Trademarks*